United States Patent
Swartley

(10) Patent No.: US 11,274,699 B2
(45) Date of Patent: Mar. 15, 2022

(54) DOUBLE ROW NEEDLE TRACK ROLLER BEARING WITH A THRUST LOAD CARRYING BALL BEARING

(71) Applicant: Roller Bearing Company of America, Inc., Oxford, CT (US)

(72) Inventor: Curtis M. Swartley, Torrington, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 0 days.

(21) Appl. No.: 17/090,521

(22) Filed: Nov. 5, 2020

(65) Prior Publication Data

US 2021/0131491 A1   May 6, 2021

Related U.S. Application Data

(60) Provisional application No. 62/930,666, filed on Nov. 5, 2019.

(51) Int. Cl.
*F16C 19/49* (2006.01)
*F16C 19/28* (2006.01)

(52) U.S. Cl.
CPC .............. *F16C 19/49* (2013.01); *F16C 19/28* (2013.01)

(58) Field of Classification Search
CPC .... F16C 19/28; F16C 19/44–48; F16C 33/60; F16C 33/6677; F16C 33/72–7896; F16C 2240/80; F16C 2326/43
See application file for complete search history.

(56) References Cited

U.S. PATENT DOCUMENTS

| | | |
|---|---|---|
| X675618 | 6/1901 | Bartholomew |
| 1,972,140 A | 9/1934 | Frank |
| 2,040,489 A | 5/1936 | Large |
| 2,470,071 A | 5/1949 | Hilton |
| 2,915,346 A | 12/1959 | Stallman |
| 3,131,006 A | 4/1964 | Anderson |
| 3,155,006 A | 11/1964 | Schroeder |
| 3,167,363 A | 1/1965 | Murphy |

(Continued)

FOREIGN PATENT DOCUMENTS

| | | |
|---|---|---|
| CN | 2703158 Y | 6/2005 |
| DE | 10 2010 049079 A1 | 4/2012 |

(Continued)

OTHER PUBLICATIONS

Extended European Search Report issued in corresponding EP Application No. 20205817 8, dated Mar. 26, 2021, pp. 1-12.

*Primary Examiner* — Alan B Waits
(74) *Attorney, Agent, or Firm* — Murtha Cullina LLP

(57) ABSTRACT

A bearing includes an outer ring with a first outer roller race, a second outer roller race, and a radially inward facing outer ball race. The bearing includes a first and second inner rings that axially abutting one another at an abutment interface. The first inner ring has a first inner roller race, the second inner ring has a second inner roller race that are disposed in an interior area coaxially with the outer ring. A plurality of first rollers rollingly engage the first outer roller race and the first inner roller race. A plurality of second rollers rollingly engage the second outer roller race and the second inner roller race. A plurality of balls rollingly engage the outer ball race and the inner ball race.

20 Claims, 9 Drawing Sheets

(56) References Cited

U.S. PATENT DOCUMENTS

| | | | |
|---|---|---|---|
| 3,405,434 | A | 10/1968 | Hoffman et al. |
| 3,424,507 | A | 1/1969 | Rollins et al. |
| 4,296,979 | A | 10/1981 | Hofmann et al. |
| 5,784,426 | A | 7/1998 | Burner et al. |
| 8,608,444 | B2 | 12/2013 | Zeidlhack |
| 8,926,186 | B2 | 1/2015 | Wolf |
| 10,065,489 | B2 | 9/2018 | Wang et al. |
| 10,081,983 | B2 | 9/2018 | Kirkhope |
| 10,393,098 | B2 | 8/2019 | Shen et al. |
| 10,753,396 | B2 | 8/2020 | Hauleitner et al. |
| 2002/0070504 | A1* | 6/2002 | Neubert ............. F16C 33/7809 277/353 |
| 2007/0266821 | A1 | 11/2007 | Azumi et al. |
| 2008/0131038 | A1 | 6/2008 | Sendzik et al. |
| 2013/0084035 | A1* | 4/2013 | Williams ............... F16C 33/60 384/472 |
| 2017/0089218 | A1 | 3/2017 | Hasting et al. |

FOREIGN PATENT DOCUMENTS

| | | |
|---|---|---|
| DE | 10 2014 218047 A1 | 3/2016 |
| EP | 3176076 A1 | 6/2017 |
| EP | 3388702 A1 | 10/2018 |
| JP | S56 24219 A | 3/1981 |
| WO | 2007125056 A1 | 11/2007 |
| WO | 2008055747 A1 | 5/2008 |
| WO | 2012014634 A1 | 2/2012 |
| WO | 2012066913 A1 | 5/2012 |
| WO | 2020078512 A1 | 4/2020 |

\* cited by examiner

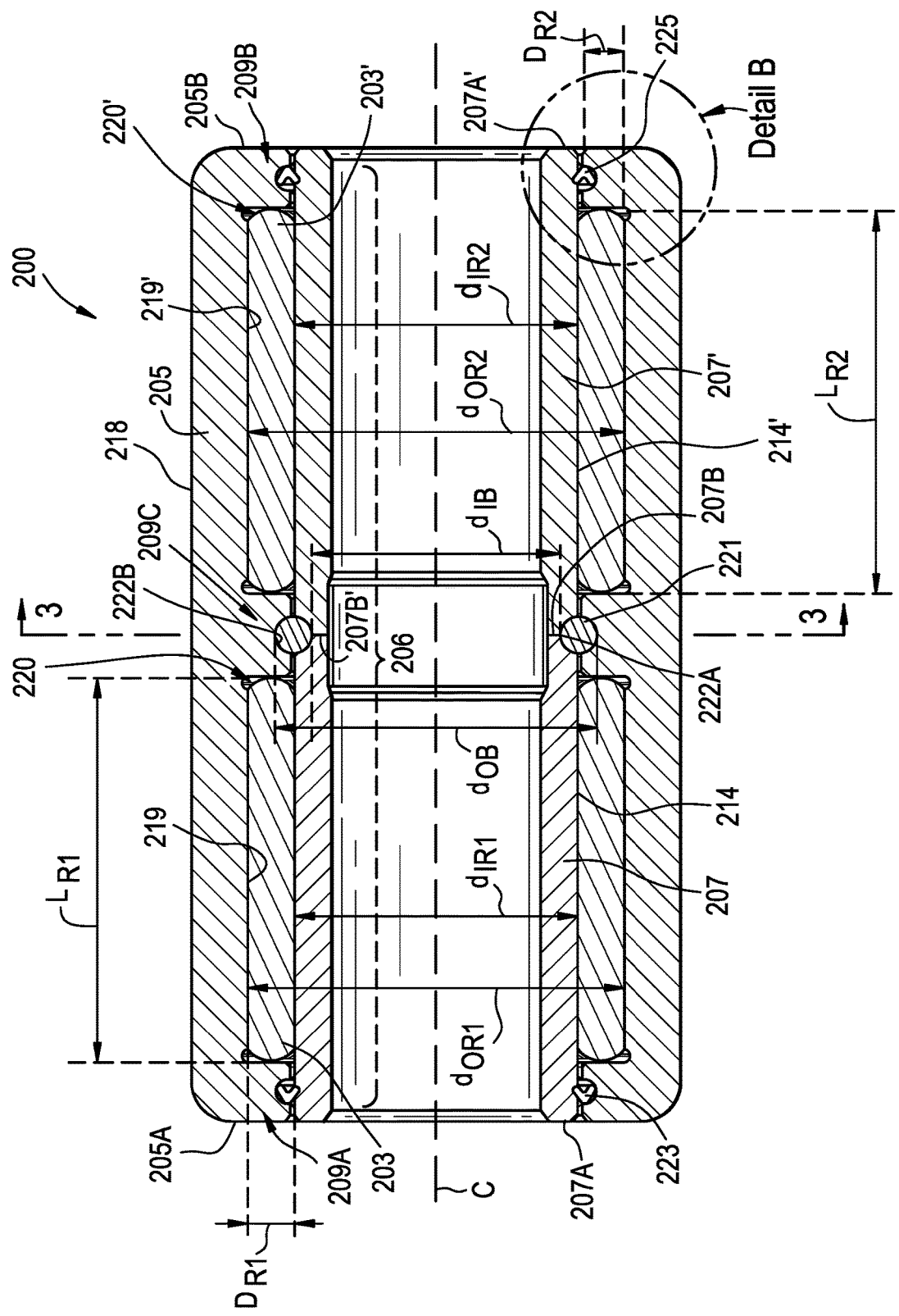

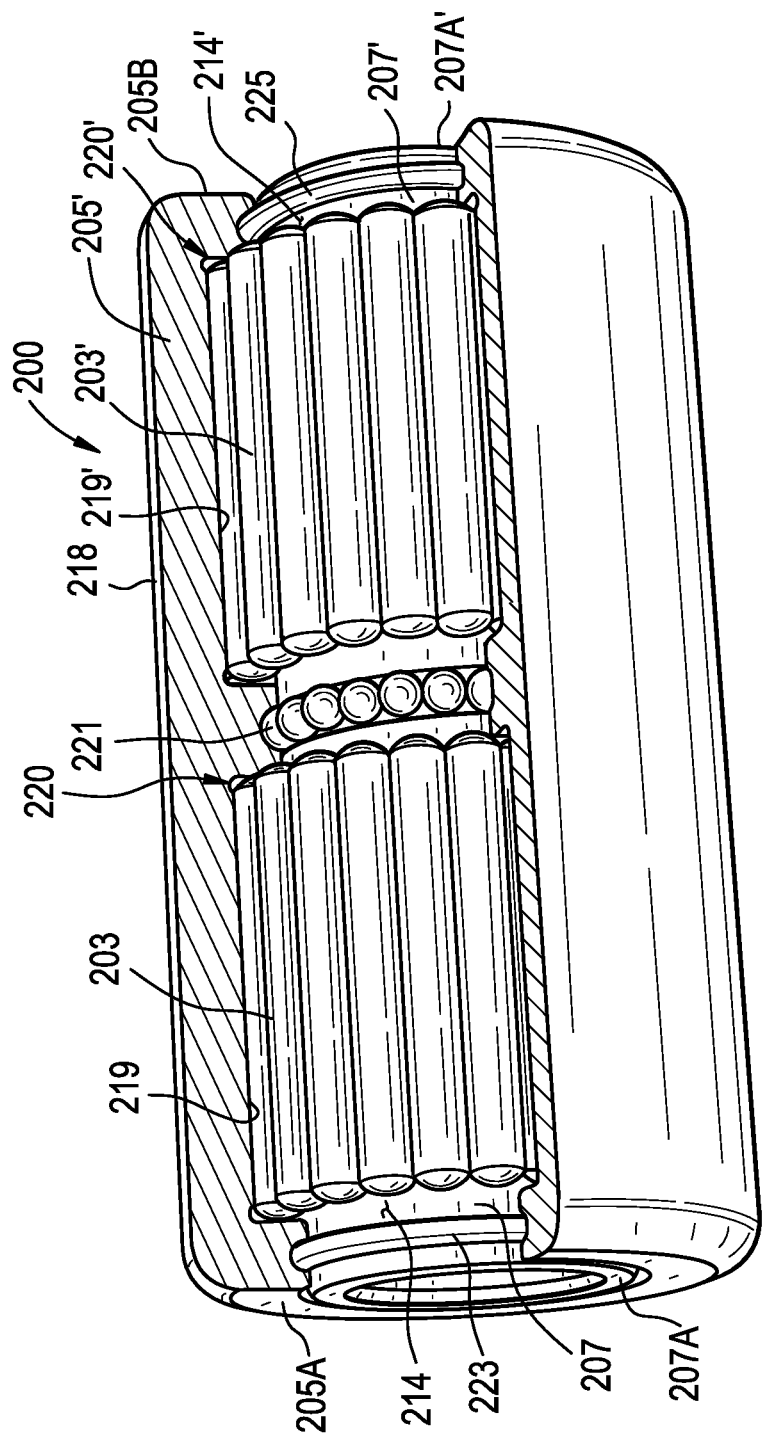

DOUBLE ROW NEEDLE TRACK ROLLER BEARING WITH A THRUST LOAD CARRYING BALL BEARING

CROSS-REFERENCE TO RELATED APPLICATIONS

This application claims the benefit of U.S. Provisional Patent Application Ser. No. 62/930,666 filed on Nov. 5, 2019, which is incorporated herein by reference in its entirety.

TECHNICAL FIELD

The present disclosure is directed to a double row needle track roller bearing and more particularly to a double row needle track roller bearing that accommodates axial thrust loads with a ball bearing and eliminates the need for re-greasing and re-lubrication.

BACKGROUND

Prior art double row needle roller track roller bearings have an outer ring and an inner ring with a plurality of needle rollers disposed therebetween and in rolling engagement with bearing surfaces of the inner and outer rings. Prior art double row needle roller track roller bearings have no ability to carry axial thrust loads. To account for this, prior art double row needle roller track roller bearings are mounted against bushings and axial ends of the outer ring rotationally rubs against the bushing to carry the axial thrust load. However, there is significant wear and friction resulting from the rubbing of the axial ends of the outer ring rotationally with the bushing. A frequent supply of lubricant must be provided to the bushing to mitigate the wear and friction.

Based on the foregoing, there is a need to provide a bearing with needle roller elements that can accommodate axial thrust load without needing periodic re-greasing.

SUMMARY

There is disclosed herein, a bearing that includes a single piece outer ring that includes a radially inward facing first outer roller race, a radially inward facing second outer roller race and a radially inward facing outer ball race. The first outer roller race, the second outer roller race and the outer ball race collectively define an interior area of the outer ring. The bearing includes an inner ring assembly that includes a first inner ring and a second inner ring that axially abuts the first inner ring at an axially abutment interface. The first inner ring has a radially outward facing first inner roller race; and the second inner ring has a radially outward facing second inner roller race. The inner ring assembly is disposed in the interior area coaxially with the outer ring. The inner ring assembly includes a radially outward facing inner ball race formed in the first inner ring and/or in the second inner ring. The bearing includes a plurality of first rollers each of which have a first roller diameter. Each of the plurality of first rollers rollingly engage the first outer roller race and the first inner roller race. The bearing includes a plurality of second rollers each of which have a second roller diameter. Each of the plurality of second rollers rollingly engage the second outer roller race and the second inner roller race. The bearing includes a plurality of balls each of which have a ball diameter and a center point. Each of the plurality of balls rollingly engage the outer ball race and the inner ball race.

In some embodiments, the outer ball race is positioned between the first outer roller race and the second outer roller race; and the inner ball race is positioned between the first inner roller race and the second inner roller race.

In some embodiments, the axial abutment interface is located between axial ends of the inner ball race.

In some embodiments, the ball diameter is less that the first roller diameter and less than the second roller diameter.

In some embodiments, the center point of each of the plurality of balls is aligned with the first inner roller race and the second inner roller race.

In some embodiments, the inner ball race includes a cylindrical segment that is coaxial with a longitudinal axis of the inner ring assembly, extends along a portion of the inner ball race and is located centrally between opposing axial ends of the inner ball race.

In some embodiments, a first seal extends between the inner ring assembly and the outer ring proximate an axial end of the outer ring and a second seal extends between the inner ring assembly and the outer ring proximate an opposing axial end of the outer ring. Each of the first seal and the second seal are configured to retain a lubricant between the inner ring assembly during and the outer ring and prior to operational use of the bearing and to retain the inner ring in a predetermined position relative to the outer ring, prior to operational use of the bearing.

In some embodiments, the bearing includes one or more lubrication supply passages (e.g., holes) in the inner ring assembly to supply a lubricant therethrough.

In some embodiments, the bearing includes one or more barriers for preventing introduction of a lubricant between the inner ring assembly and the outer ring after the bearing is assembled. In some embodiments, the barrier includes the inner ring assembly, the outer ring, the first seal and the second seal.

In some embodiments, each of the plurality of first rollers has a first axial length and a first diameter and an aspect ratio of the first length to the first diameter is between 3 to 1 and 12 to 1. In some embodiments, each of the plurality of second rollers has a second axial length and a second diameter and an aspect ratio of the second length to the second diameter is between 3 to 1 and 12 to 1.

In some embodiments, the inner ball race has a first depth and the outer ball race has a second depth. The first depth and the second depth each have a magnitude equal to 35 percent to 45 percent of the ball diameter.

In some embodiments, the plurality of balls is a full complement without separators such that each of the plurality of balls touch two adjacent balls.

In some embodiments, an exterior axial surface of the first inner ring and/or the second inner ring extends a standoff distance beyond a respective exterior axial surface of the outer ring and the plurality of balls define an axial play that is less than the standoff distance.

In some embodiments, the bearing is installed in an actuation system for deploying and retracting a lift assisting device of a wing of an aircraft. The actuation system includes a track that is pivotally coupled to the lift assisting device. The track has a first and second guide surfaces. A plurality of the bearings of the present invention rotatably contact the first and second guide surfaces of the track to guide the track along an arcuate path.

In some embodiments, the bearing also includes a lubrication supply passage in the inner ring assembly to supply a lubricant therethrough.

In some embodiments, the outer ball race defines a ball outer diameter and the inner ball race defines an inner ball diameter. A radial play of the group of balls is defined as the difference between the ball outer diameter, the inner ball diameter and the two times the ball diameter.

In some embodiments, the outer ball race has a maximum inside diameter and the inner ball race has a minimum outside diameter. A radial play of the plurality of balls is defined as the maximum inside diameter minus the minimum outside diameter minus the two times the ball diameter.

The first plurality of rollers each have a first roller diameter and the second plurality of rollers each have a second roller diameter. The first outer roller race defines a first outer roller diameter, the first inner roller race defines a first inner roller diameter, the second outer roller race defines a second outer roller diameter and the second inner roller race defines a second inner roller diameter. A first roller radial play is defined as the first outer roller diameter minus the first inner roller diameter $d_{IR1}$ minus two times the first roller diameter. A second roller radial play is defined as the second outer roller diameter minus the second inner roller diameter minus two times the second roller diameter. The radial play of the plurality of balls is greater than the first roller radial play and the radial play of the plurality of balls is greater than the second roller radial play.

In some embodiments, the bearing also includes a retention groove defined between the outer ball race and the inner ball race. The inner rings and the outer ring are centered on a longitudinal axis. A first radial capacity is defined as a total load accommodated by the first group of rollers in a direction perpendicular to the longitudinal axis, between one roller of the first group of rollers, the first inner roller race and the first outer roller race. A second radial capacity is defined as a total load accommodated by the second group of rollers in a direction perpendicular to the longitudinal axis, between one roller of the second group of rollers, the second inner roller race and the second outer roller race. The group of balls accommodates a load in a direction parallel to the longitudinal axis that is at least 10% of the total of the first radial capacity and the second radial capacity.

In some embodiments, the bearing also includes a retention ring extending between opposing ends of the inner ring and the outer ring. Each of the retention rings retains the two piece assembly of the inner ring in a predetermined position relative to the outer ring, prior to use.

The present invention includes an actuation system for deploying and retracting a lift assisting device of a wing of an aircraft. The actuation system includes a track pivotally coupled to the lift assisting device. The track has a first outer surface and second a second outer surface opposite the first outer surface. A plurality of bearings are disposed in communication (i.e., rolling contact with) with the track. Each of the bearings includes a single piece outer ring that includes a radially inward facing first outer roller race, a radially inward facing second outer roller race and a radially inward facing outer ball race. The first outer roller race and the second outer roller race and the outer ball race define an interior area of the outer ring. Each of the bearings includes an inner ring assembly that includes a first inner ring and a second inner ring that axially abut one another at an abutment interface. The first inner ring has a radially outward facing first inner roller race and the second inner ring has a radially outward facing second inner roller race. The inner ring assembly is disposed in the interior area coaxially with the outer ring. The inner ring has a radially outward facing inner ball race formed in one or both of the first inner ring and the second inner ring. A plurality of first rollers, each having a first roller diameter and rollingly engage the first outer roller race and the first inner roller race. A plurality of second rollers each have a second roller diameter and rollingly engage the second outer roller race and the second inner roller race. A plurality of balls each have a ball diameter and a center point. Each of the plurality of balls rollingly engage the outer ball race and the inner ball race. The outer ring has an outside surface that rollingly contacts one of the first outer surface and the second outer surface of the track to guide the track along an arcuate path.

In one embodiment, the outer ball race is positioned between the first outer roller race and the second outer roller race and wherein the inner ball race is positioned between the first inner roller race and the second inner roller race.

In some embodiments, the abutment interface is located between axial ends of the inner ball race.

In some embodiments, the ball diameter is less that the first roller diameter and less than the second roller diameter.

In some embodiments, the center point of each of the plurality of balls is aligned with the first inner roller race and the second inner roller race.

In some embodiments, the inner ball race includes a cylindrical segment that is coaxial with a longitudinal axis of the inner ring assembly, extends along a portion of the inner ball race and is located centrally between opposing axial ends of the inner ball race.

BRIEF DESCRIPTION OF THE DRAWINGS

FIG. 1A is a front, cross-sectional view of a bearing according to one embodiment of the present disclosure;

FIG. 2 is an isometric, three-quarter section view of the bearing of FIG. 1A;

DETAILED DESCRIPTION

Figure 1B:
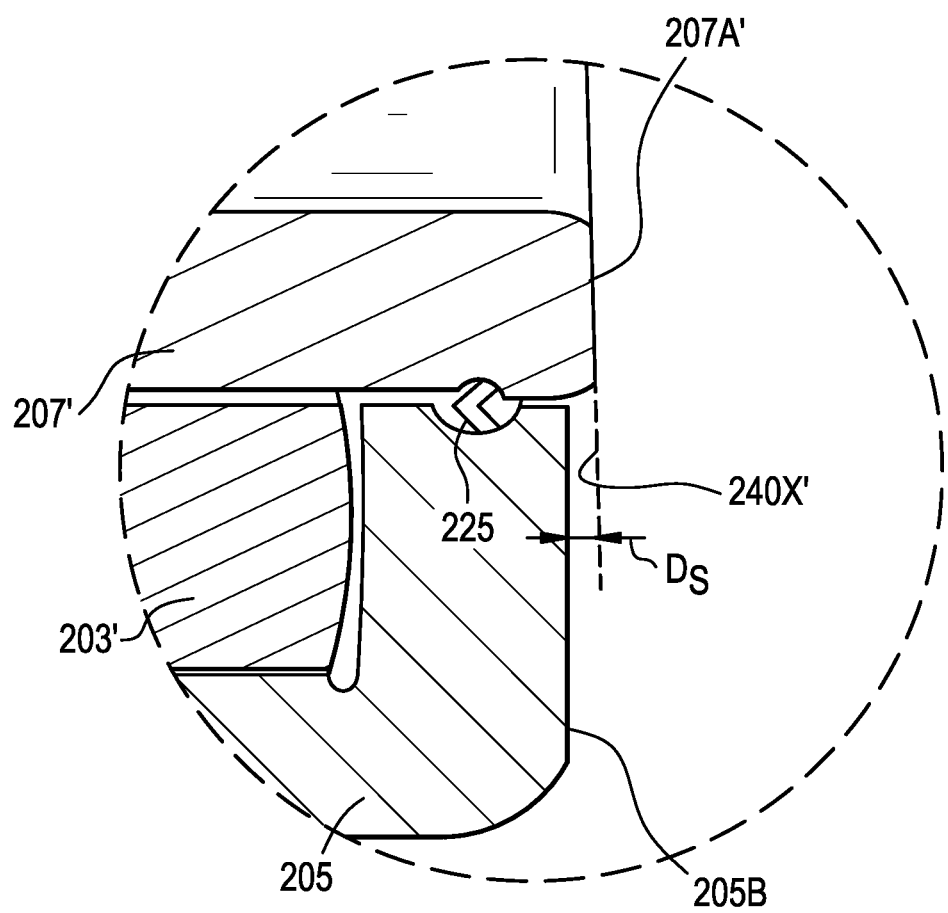
FIG. 1B is a partial, cross-sectional view of the portion of the bearing of FIG. 1A within Detail B including a bushing for reference thereto.

As shown in FIG. 1A, the bearing of the present invention is generally designated by the numeral 200. The bearing 200 has utility in accommodating axial thrust loads and eliminating the need for relubrication during operation of the bearing 200. The bearing 200 has a double channel configuration, as described herein. The bearing 200 includes a single piece outer ring 205 that has a radially inward facing first outer roller race 219, a radially inward facing second outer roller race 219' and a radially inward facing outer ball race 222B. The outer ball race 222B is positioned between the first outer roller race 219 and the second outer roller race 219'. The first outer roller race 219, the second outer roller race 219' and the outer ball race 222B define an interior area of the outer ring 205.

As shown in FIG. 1A, the bearing 200 includes an inner ring assembly 206 which includes a first inner ring 207 and a second inner ring 207'. Assembly of the bearing 200 is facilitated by the inner ring assembly 206 having the first inner ring 207 and the second inner ring 207'. The first inner ring 207 and the second inner ring 207' axially abut one another at an abutment interface, as described further herein. The first inner ring 207 has a radially outward facing first inner roller race 214; and the second inner ring 207' has a radially outward facing second inner roller race 214'. The inner ring assembly 206 is disposed in the interior area of the outer ring 205, coaxially with the outer ring 205. The inner ring assembly 206 includes a radially outward facing inner ball race 222A formed in the first inner ring 207 and the second inner ring 207', as described further herein. While the inner ball race 222A is shown and described as being formed in the first inner ring 207 and the second inner ring 207', the present invention is not limited in this regard, as other configurations may be employed without departing from the broader aspects of the present invention, including but not limited to the inner ball race 222A being formed entirely in the first inner ring 207 or the inner ball race 222A being formed entirely in the second inner ring 207'.

While the bearing 200 is shown and described as having a double channel design and having a two piece inner ring assembly 206, the present disclosure is not limited in this regard as other configurations may be employed including but not limited to single channel designs and a one piece inner ring.

As shown in FIG. 1A, the interior area includes a first cavity 220 located between the first outer roller race 219 and the first inner roller race 214 and a second cavity 220'' located between the second outer roller race 219' and the second inner roller race 214. The first cavity 220 and the second cavity 220' are initially filled with a lubricant (e.g., grease) during final assembly. After final assembly and during the operating life of the bearing 200, no additional lubricant is supplied to the bearing 200.

As shown in FIG. 1A, a plurality of first rollers 203 (e.g., needle roller elements) are disposed in the first cavity 220 between the outer ring 205 and the first inner ring 207 and rollingly engage the first outer roller race 219 and the first inner roller race 214. Each of the plurality of first rollers 203 have a first roller diameter $D_{R1}$. A plurality of second rollers 203' (e.g., needle roller elements) are disposed in the second cavity 220' between the outer ring 205 and the second inner ring 207' and rollingly engage the second outer roller race 219' and the second inner roller race 214'. Each of the plurality of second rollers 203' have a second roller diameter $D_{R2}$. A plurality of balls 221 are disposed between the outer ring 205 and the inner ring assembly 206. Each of the plurality of balls 221 rollingly engage the outer ball race 222B and the inner ball race 222A. As best shown in FIG. 1E, each of the balls 221 has a ball diameter ($D_B$) and a center point (CP).

Referring to FIG. 1A, the outer ball race 222B is positioned between the first outer roller race 219 and the second outer roller race 219'; and the inner ball race 222A is positioned between the first inner roller race 214 and the second inner roller race 214'. Why aren't these labeled by 222A?

As shown in FIG. 1A, the first inner ring 207 extends continuously between a first axial end 207A and a second axial end 207B thereof. The second inner ring 207' extends continuously between a first axial end 207A' and a second axial end 207B' thereof. The first inner roller race 214 extends continuously circumferentially around the first inner ring 207 with no holes or passages extending therethrough. The second inner roller race 214' extends continuously circumferentially around the second inner ring 207' with no holes or passages extending therethrough. The outer ring 205 has an outer surface 218 (e.g., cylindrical exterior surface) that extends continuously between a first axial end 205A and a second axial end 205B of the outer ring 205. The outer surface 218 extends continuously circumferentially around the outer ring 205 with no holes or passages extending therethrough. The outer ring 205 includes a first radially inward extending flange 209A located proximate to the first axial end 205A and a second radially inward extending flange 209B located proximate to the second axial end 205B. The outer ring 205 has a third radially inward extending flange 209C positioned between (e.g., mid-way between) the first radially inward extending flange 209A and the second radially inward extending flange 209B. The outer ball race 222B interrupts (i.e., extends radially and axially outwardly into) a radially inside circumferential surface 205C (see FIG. 1D) of the third radially inward extending flange 209C. The first outer roller race 219 extends between the first radially inward extending flange 209A and the third radially inward extending flange 209C. The second outer roller race 219' extends between the second radially inward extending flange 209B and the third radially inward extending flange 209C.

As shown in FIG. 1E, the abutment interface is located along a reference plane 207X designated by the engagement of the second end axial 207B of the first inner ring 207 and the second axial end 207B' of the second inner ring 207'. The abutment interface is located equidistant between axial ends 222AX and 222AY of the inner ball race 222A. The ball diameter $D_B$ is less than the first roller diameter $D_{R1}$ (see FIG. 1A) and less than the second roller diameter $D_{R2}$ (see FIG. 1A). Each of the plurality of balls 221 has a center point CP that is aligned with the first inner roller race 214 and the second inner roller race 214'. The present invention has utility in that having the outer ball race 222B and the inner ball race 222A configured in this manor allows for assembly of the ball bearing 200 with a full complement of balls 221. This increases the capacity of the bearing 200. Also having the inner ring assembly 206 split into the first inner ring 207 and the second inner ring 207' allows for the inner ring assembly to not fracture due to pin bending resulting for heavy radial applied loads. So the invention allows for the ball bearing 200 with increased capacity to carry thrust load while also allowing easy assembly and reduced risk of inner ring assembly 206 fracture due to shaft pin bending as a result of high radial applied loads. In addition, having the inner ball race 222A positioned between the first inner roller race 214 and the second inner roller race 214' has utility in making the radial displacement more consistent than other configurations and assists in achieving the radial play $P_B$ (see Equation 1, herein) of the plurality of balls 221 to be greater than the first roller radial play $P_{R1}$ (see Equation 3, herein) and the second roller radial play $P_{R2}$ (see Equation 4, herein) so that the balls 221 never carry radial load, but only axial load.

Figure 1C:
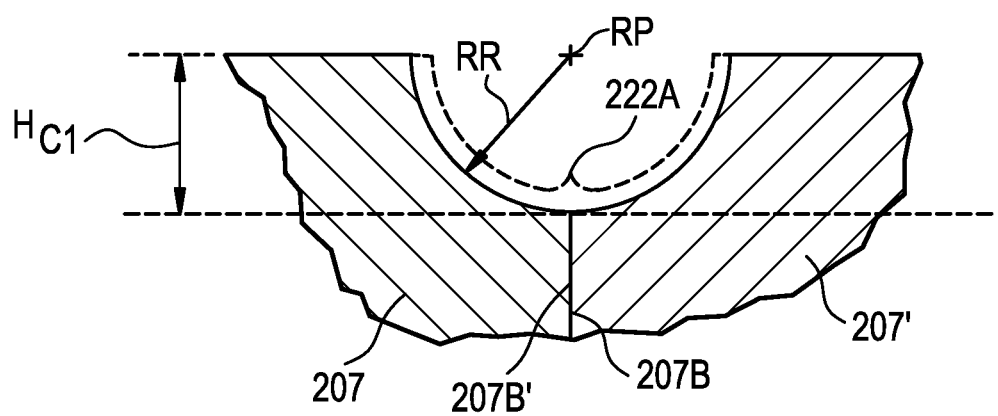
FIG. 1C is an enlarged cross sectional view of a portion of the inner ring assembly of FIG. 1A.
Figure 1D:
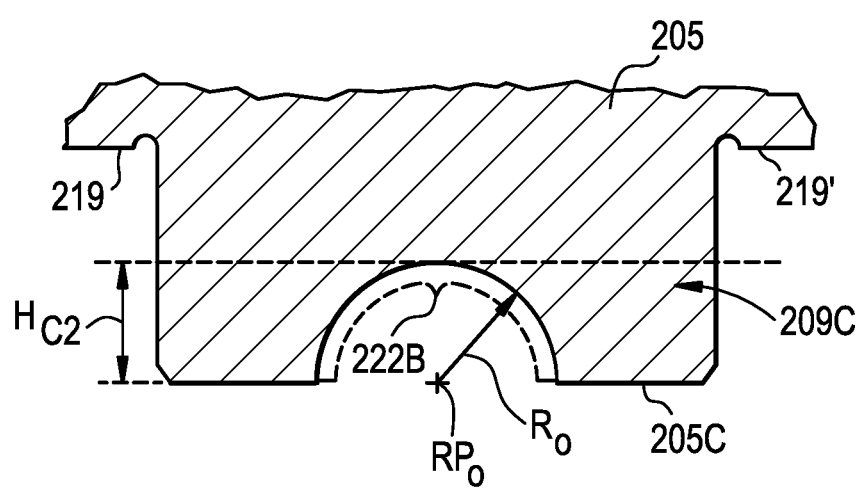
FIG. 1D is an enlarged cross sectional view of a portion of the outer ring of FIG. 1A.
Figure 1E:
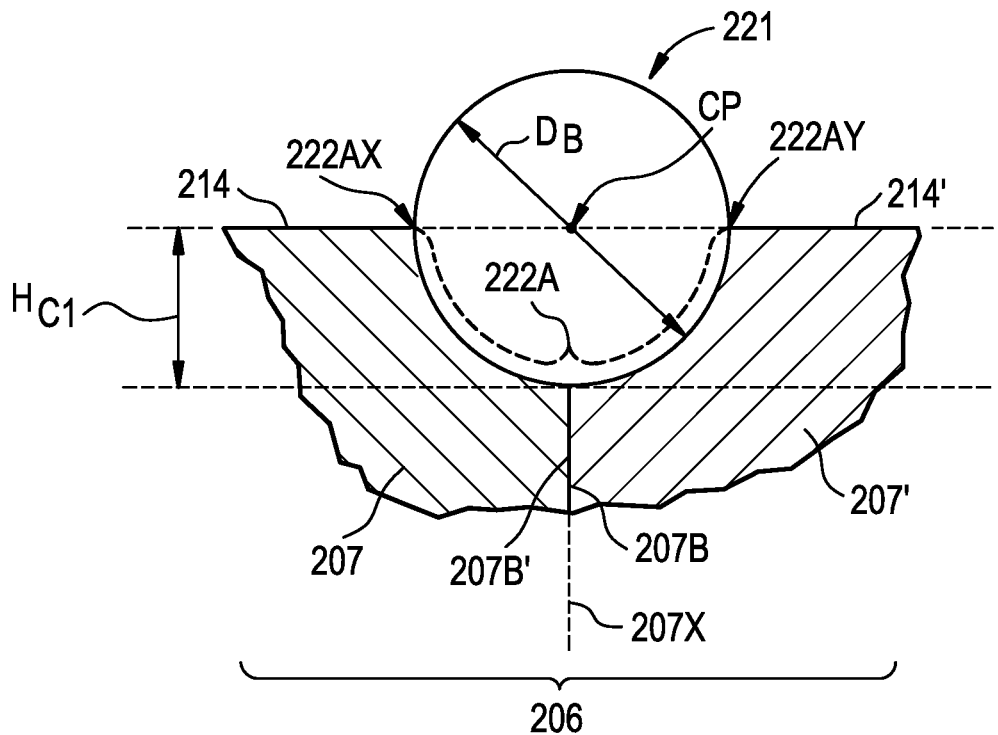
FIG. 1E is an enlarged cross sectional view of a portion of the inner ring assembly of FIG. 1A with a ball shown therein.
Figure 1F:
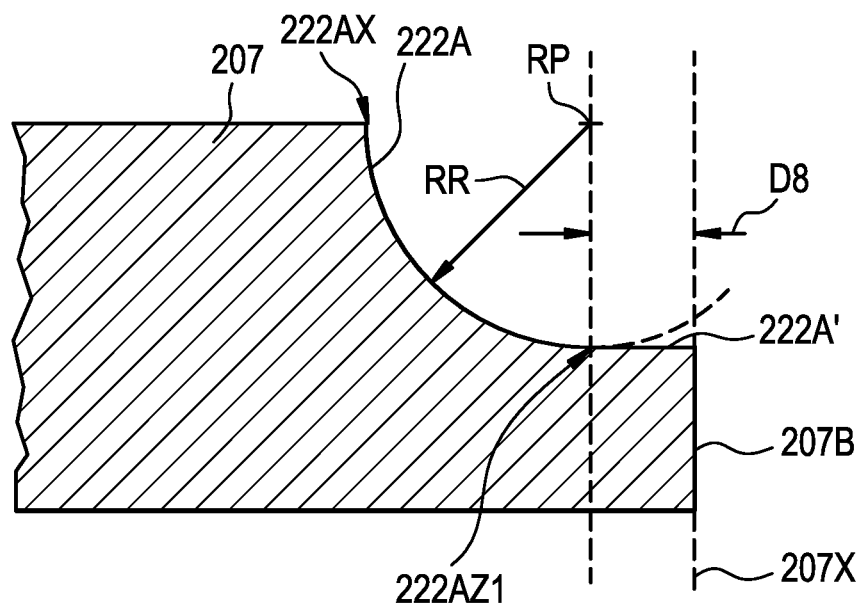
FIG. 1F is an enlarged view of a portion of the inner ball race of the inner ring assembly of FIG. 1A illustrating an embodiment with a partial cylindrical segment on the inner ball race.
Figure 1G:
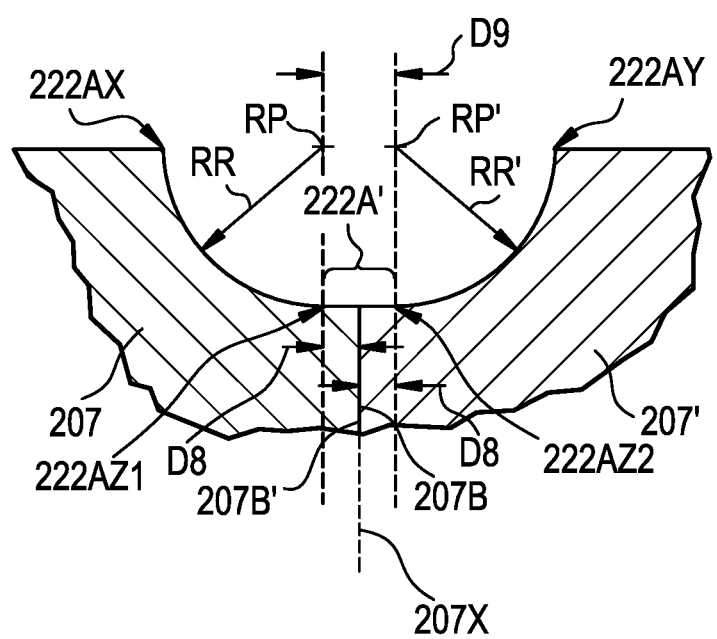
FIG. 1G is an enlarged view of the inner ball race of the inner ring assembly of FIG. 1A illustrating an embodiment with a partial cylindrical segment on the inner ball race.

As shown in FIGS. 1F and 1G, in some embodiments, the inner ball race 222A includes a cylindrical segment 222A' that is coaxial with a longitudinal axis C (see FIG. 1A) of the inner ring assembly 206 (see FIG. 1A) and extending along a portion of the inner ball race 222A and located centrally between opposing axial ends 222AX and 222AY of the inner ball race 222A. As shown in FIG. 1F, a portion of the inner ball race 222A between the axial end 222AX and a first transition point 222AZ1 has a radius RR that extends from a center point RP of the inner ball race 222A of the first inner ring 207. The portion of the inner ball race 222A between the axial end 222AX and a first transition point 222AZ1 is circumferential arc segment of a circle having the radius RR. A portion of the cylindrical segment 222A' on the first inner ring 207 initiates at the first transition point 222AZ1 and terminates at the second axial end 207B of the first inner ring 207. The first transition point 222AZ1 is spaced apart from the second axial end 207B of the first inner ring 207 by a distance D8. The distance D8 is between zero and 3 percent of the radius RR.

As shown in FIG. 1G, a portion of the inner ball race 222A of the second inner ring 207' is a mirror image of the portion of the inner ball race 222A of the first inner ring 207. A portion of the inner ball race 222A between the axial end 222AY and a first transition point 222AZ2 has a radius RR that extends from a center point RR' of the inner ball race 222A of the second inner ring 207'. The portion of the inner ball race 222A between the axial end 222AY and a second transition point 222AZ1 is circumferential arc segment of a circle having the radius RR'. A portion of the cylindrical segment 222A' on the second inner ring 207' initiates at the second transition point 222AZ2 and terminates at the second axial end 207B' of the second inner ring 207'. The second transition point 222AZ2 is spaced apart from the second axial end 207B' of the second inner ring 207' by a distance D8. The distance D8 is between zero and 3 percent of the radius RR. As shown in FIG. 1G, the first transition point 222AZ1 is spaced apart from the second transition point 222AZ2 such that the cylindrical segment 222A' extends a distance D9 between the first transition point 222AZ1 and the second transition point 222AZ2. The distance D9 is about two times the distance D8, namely, between zero and 6 percent of the radius RR or the radius RR'. However, in some embodiments, the distance D8 (and therefore D9) is equal to zero and there is no cylindrical segment 222A', for example see FIG. 1C.

A ratio of the radius RR of the portion of the inner ball race 222A of the first inner ring 207 to the diameter $D_B$ of the ball 221 (i.e., ratio=RR/$D_B$) is about 50.5/100 to 58/100 (i.e., 50.5 to 58 percent). In a preferred embodiment, the ratio of the first inner ring to the diameter $D_B$ of the ball 221 is about 53/100 (i.e., 53 percent). A ratio of the radius RR' of the portion of the inner ball race 222A of the second inner ring 207' to the diameter $D_B$ of the ball 221 (i.e., ratio=RR/$D_B$) is about 50.5/100 to 58/100 (i.e., 50.5 to 58 percent). In a preferred embodiment, the ratio of the second inner ring 207' to the diameter $D_B$ of the ball 221 is about 53/100 (i.e., 53 percent).

Referring to FIG. 1A, a first seal 223 extends between the first inner ring 207 and the outer ring 205 proximate to the first axial end 207A of the first inner ring 207 and proximate to the first axial end 205A of the outer ring 205. A second seal 225 extends between the second inner ring 207' and the outer ring 205 proximate to the first axial end 207A' of the second inner ring 207' and proximate the second axial end 205B of the outer ring 205. Each of the first seal 223 and the second seal 225 retain a lubricant between the inner ring assembly 206 and the outer ring 205. The first seal 223 and the second seal 225 also have utility to retain the first inner ring 207 and the second inner ring 207' in predetermined positions relative to the outer ring 205, prior to operational use (e.g., after assembly and during shipping).

Referring to FIG. 1A, the bearing 200 includes several barriers for preventing the introduction of a lubricant between the inner ring assembly 206 and the outer ring 205 when the bearing 200 is assembled. The barriers are defined by the first outer roller race 219; the second outer roller race 219'; the first inner roller race 214'; the second inner roller race 214'; the engagement of the second axial end 207B of the first inner ring 207 and the second axial end 207B' of the second inner ring 207' at the abutment interface; the first seal 223 and the second seal 225.

Figure 4:
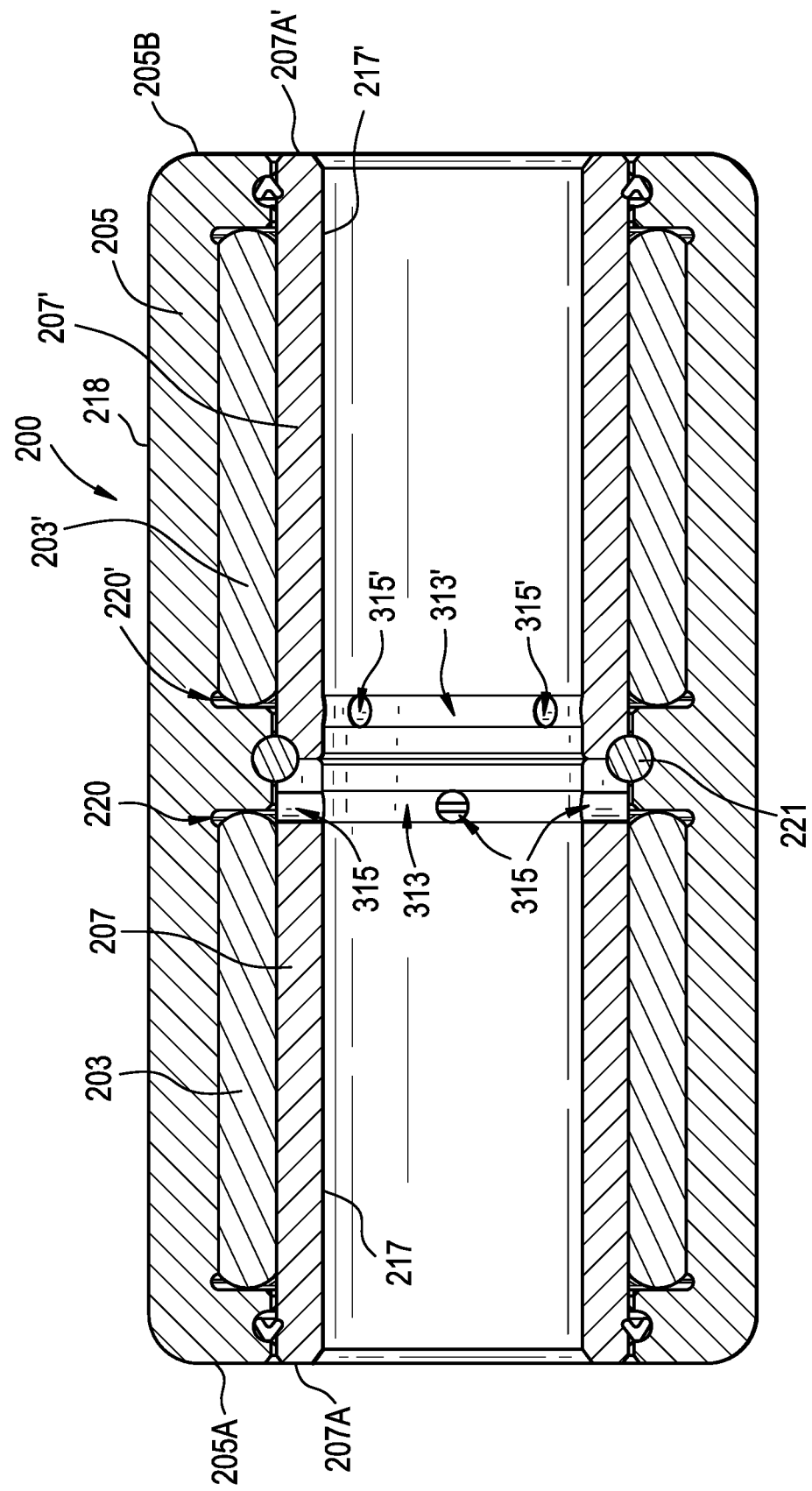
FIG. 4 is a front, cross-sectional view of an alternate embodiment of a bearing according to another embodiment of the present disclosure.

While the bearing 200 is described as having barriers for preventing the introduction of a lubricant between the inner ring assembly 206 and the outer ring 205, the present invention is not limited in this regard as other configurations may be employed including but not limited to embodiments with a plurality of holes 315 that form lubrication supply passages for supplying lubricant through the first inner ring 207 and a plurality of holes 315' that form lubrication supply passages for supplying lubricant through the second inner ring 207', as shown, for example, in FIG. 4. The holes 315 provide a path for the introduction of the lubricant between the first inner ring 207 and the outer ring 205 and the holes 315' provide a path for the introduction of the lubricant between the second inner ring 207' and the outer ring 205. In the embodiment depicted in FIG. 4, the holes 315 communicate with a groove 313 formed on an inner surface 217 of the first inner ring 207 and the holes 315' communicate with a groove 313' formed on the inner surface 217' of the second inner ring 207'.

Referring to FIG. 1A, the first plurality of rollers 203 has a first length $L_{R1}$ and a first diameter $D_{R1}$. An aspect ratio of the first length $L_{R1}$ to the first diameter $D_{R1}$ of each of the first plurality of rollers 203 is between 3 to 1 and 12 to 1. The second plurality of rollers 203' has a second length $L_{R2}$ and a second diameter $D_{R2}$. An aspect ratio of the second length $L_{R2}$ to the first diameter $D_{R2}$ of each of the second plurality of rollers 203' is between 3 to 1 and 12 to 1. In the embodiment depicted in FIG. 1A, the aspect ratio of the first plurality of rollers 203 is approximately 9 to 1 and the aspect ratio of the second plurality of rollers 203' is approximately 9 to 1.

Referring to FIG. 1C, the inner ball race 222A has a first depth $H_{C1}$. As shown in FIG. 1D the outer ball race 222B has a second depth $H_{C2}$ that extends to a radially inside circumferential surface 205C of the third radially inward extending flange 209C. The first depth $H_{C1}$ and the second depth $H_{C2}$ each have a magnitude equal to 35 percent to 45 percent of the ball diameter $D_B$.

Figure 3:
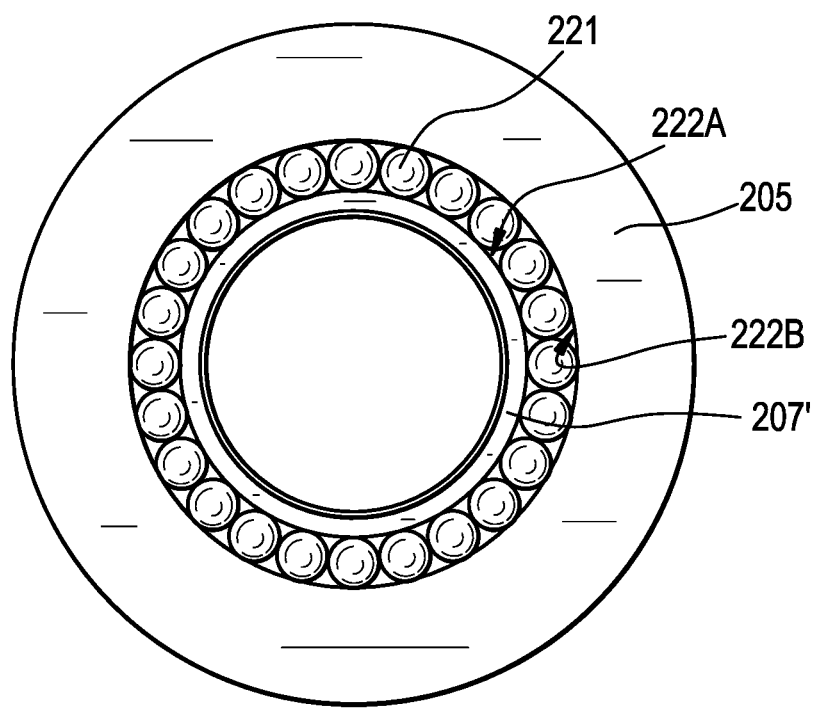
FIG. 3 is a cross-sectional view of the bearing of FIG. 1A taken along line 3-3.

Referring to FIG. 3, each of the plurality of balls 221 is a full complement without separators such that each of the plurality of balls 221 contacts two adjacent balls 221, during use. As illustrated in FIG. 3, twenty-four balls 221 are arranged between inner ball race 222A and outer ball race 222B. While not limited in this regard, more or fewer than twenty-four balls 221 could be arranged between the inner ball race 222A and the outer ball race 222B.

Referring to FIG. 1B, the first axial end 207A' of the second inner ring 207' extends a standoff distance $D_S$ beyond the second axial end 205B of the outer ring 205. The first axial end 207A of the first inner ring 207 has a standoff distance beyond the second axial end 205B of the outer ring 205, similar to that shown in FIG. 1B for the second inner ring 207'.

Referring to FIG. 1A, the outer ball race 222B has a maximum inside diameter $d_{OB}$ and the inner ball race 222A has a minimum outside diameter $d_{IB}$. A radial play $P_B$ (not used in the FIGS. only in the Equation 1) of the plurality of balls 221 is defined the maximum inside diameter $d_{OB}$ minus the minimum outside diameter $d_{IB}$ minus the two times the ball diameter $D_B$. The radial play $P_B$ of the plurality of balls 221 can be expressed by Equation 1 as follows:

$$P_B = d_{OB} - d_{IB} - 2D_B \quad \text{(Equation 1)}$$

An axial play $P_e$ (not used in the FIGS. only in the Equation 2) of the plurality of balls 221 is defined by Equation 2 as follows, wherein $r_o$ is the radius of the outer ball race 222B measured from the center point $RP_O$ of the outer ball race 222B, as shown in FIG. 1D and RR is the radius of the inner ball race 222A, as shown in FIG. 1C:

$$P_e = \sqrt{4(r_o + RR - D_B)P_B - P_B^2} \quad \text{(Equation 2)}$$

The plurality of balls 221 have an axial play $P_e$ that is less than the standoff distance $D_S$.

Referring to FIG. 1A, the first plurality of rollers 203 each have a first roller diameter $D_{R1}$ and the second plurality of rollers 203' each have a second roller diameter $D_{R2}$. The first outer roller race 219 defines a first inside diameter $d_{OR1}$, the first inner roller race 214 defines a first outside diameter $d_{IR1}$, the second outer roller race 219' defines a second inside diameter $d_{OR2}$ and the second inner roller race 214' defines a second outside diameter $d_{IR2}$. A first roller radial play $P_{R1}$ is defined as the first inside diameter $d_{OR1}$ minus the first outside diameter $d_{IR1}$ minus two times the first roller diameter $D_{R1}$. The first roller radial play $P_{R1}$ can be expressed by the equation:

$$P_{R1} = d_{OR1} - d_{IR1} - 2D_{B1} \quad \text{(Equation 3)}$$

A second roller radial play $P_{R2}$ is defined as the second inside diameter $d_{OR2}$ minus the second outside diameter $d_{IR2}$ minus two times the second roller diameter $D_{R2}$. The second roller radial play $P_{R2}$ can be expressed by the equation:

$$P_{R2} = d_{OR2} - d_{IR2} - 2D_{R2} \quad \text{(Equation 4)}$$

The radial play $P_B$ of the plurality of balls 221 is greater than the first roller radial play $P_{R1}$ and the radial play $P_B$ of the plurality of balls 221 is greater than the second roller radial play $P_{R2}$. As a result, the first plurality of rollers 203 and/or the second plurality of rollers 203' accommodate radial loads between the outer ring 205 and the inner rings 207, 207' and the plurality of balls 221 do not accommodate any significant radial loads. However, the plurality of balls 221 do accommodate axial loads.

A first radial capacity is defined as a total load accommodated by the first plurality of rollers 203, exerted in a direction perpendicular to the longitudinal axis C, between one of the first plurality of rollers 203, the first inner roller race 214 and the first outer roller race 219. A second radial capacity is defined as a total load accommodated by the second plurality of rollers 203', exerted in a direction perpendicular to the longitudinal axis C, between one of the second plurality of rollers 203', the second inner roller race 214' and the second outer roller race 219'. The plurality of balls 221 accommodate an axial load, exerted in a direction parallel to the longitudinal axis C, that is at least 10 percent of the total of the first radial capacity or at least 10 percent of the second radial capacity.

In some embodiments, a retention ring (not depicted) extends between opposing ends of the inner ring assembly 206 and the outer ring 205 to retain the two piece assembly of the inner ring assembly 206 in a predetermined position relative to the outer ring 205, prior to use.

In one embodiment, the outer ring 205, the first inner ring 207, the second inner ring 207', the first pluralities of rollers 203, the second plurality of rollers 203', and the plurality of balls 221 of the bearing 200 are manufactured from a hardened stainless steel such as, for example, 440C, 52100, 422 stainless with a special nitriding process (AeroCres®) (AEROCRES is registered trademark of RBC Aircraft Products, Inc., Oxford, Conn. USA), XD-15NW, and Cronidur 30.

Figure 5:
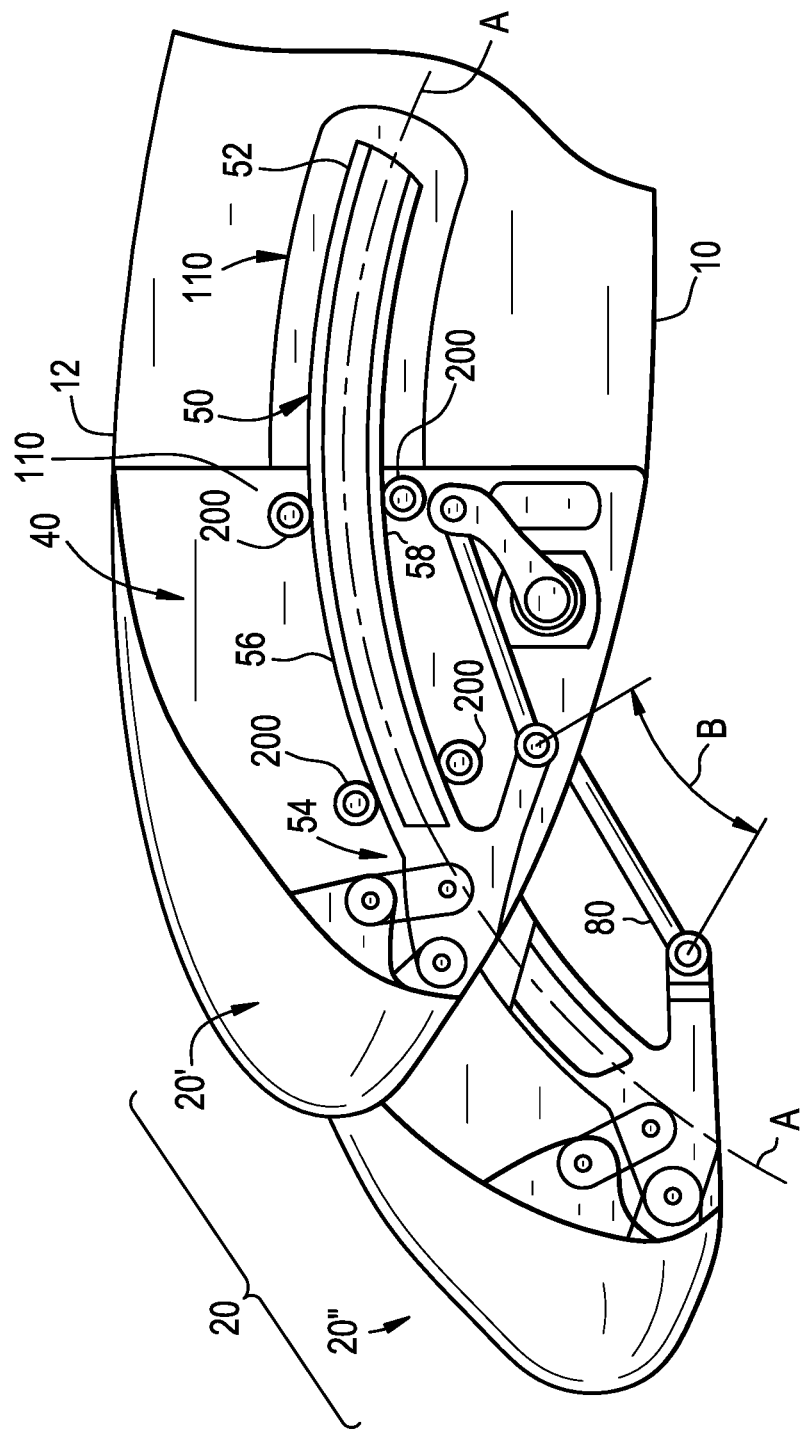
FIG. 5 is a plan view of a track roller assembly of a leading edge of an aircraft wing with the bearings of the present invention disposed therein.

As shown in FIG. 5, the bearings 200 are utilized in an actuation system 40 of a wing 10 of an aircraft. FIG. 5 provides a plan view of a leading edge section 12 of a wing of an aircraft. The wing 10 includes a plurality of slat panels 20 deployed along the leading edge 12 of the wing 10. The actuation system 40 selectively extends and retracts the slat panels 20 relative to the leading edge 12 in response to flight control signals, as is generally known in the art. As shown in FIG. 5, four of the bearings 200 of the present invention are coupled to a mounting web 110 about a first outer surface 56 and a second outer surface 58 of a track 50 to support and guide the track 50 during deployment and retraction of the track 50. The track 50 track is pivotally coupled to the lift assisting device and extends along an arcuate path A from a rear portion 52 to a forward portion 54. The outer surface 218 of the outer ring 205 of each bearing 200 rollingly contacts either the first outer surface 56 or the second outer surface 58 of the track 50 to guide the track 50 along the arcuate path A. In the retracted position 20' (e.g., flight position) the slat panel 20 is located against the leading edge 12 of the wing 10 and in the deployed position 20" (e.g., take-off and landing position) the slat panel 20 is deployed downwardly and forwardly away from the leading edge portion 12 of the wing 10 (see arrow B), thus increasing a surface area of the wing 10 to vary the wing's lift-enhancing characteristics.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of the appended claims.

What is claimed is:
1. A bearing comprising:
a single piece outer ring comprising a radially inward facing first outer roller race, a radially inward facing second outer roller race and a radially inward facing outer ball race, the first outer roller race, the second outer roller race and the outer ball race defining an interior area of the outer ring;
an inner ring assembly comprising a first inner ring and a second inner ring axially abutting one another at an abutment interface, the first inner ring having a radially outward facing first inner roller race, the second inner ring having a radially outward facing second inner roller race, the inner ring assembly being disposed in the interior area coaxially with the outer ring, and a radially outward facing inner ball race formed in at least one of the first inner ring and the second inner ring;

a plurality of first rollers each having a first roller diameter, each of the plurality of first rollers rollingly engaging the first outer roller race and the first inner roller race;
a plurality of second rollers each having a second roller diameter, each of the plurality of second rollers rollingly engaging the second outer roller race and the second inner roller race; and
a plurality of balls each having a ball diameter and a center point, each of the plurality of balls rollingly engaging the outer ball race and the inner ball race,
wherein each of the center points is aligned with the first inner roller race and the second inner roller race.

2. The bearing of claim 1, wherein the outer ball race is positioned between the first outer roller race and the second outer roller race, and wherein the inner ball race is positioned between the first inner roller race and the second inner roller race.

3. The bearing of claim 1, wherein the abutment interface is located between axial ends of the inner ball race.

4. The bearing of claim 1, wherein the ball diameter is less than the first roller diameter and less than the second roller diameter.

5. The bearing of claim 1, wherein the inner ball race comprises a cylindrical segment coaxial with a longitudinal axis of the inner ring assembly and extending along a portion of the inner ball race and located centrally between opposing axial ends of the inner ball race.

6. The bearing of claim 1, further comprising a first seal extending between the inner ring assembly and the outer ring proximate an axial end of the outer ring and a second seal extending between the inner ring assembly and the outer ring proximate an opposing axial end of the outer ring, each of the first seal and the second seal being configured to retain a lubricant between the inner ring assembly and the outer ring prior to and during operational use of the bearing to retain the inner ring assembly in a predetermined position relative to the outer ring, prior to operational use of the bearing.

7. The bearing of claim 6, further comprising at least one barrier for preventing introduction of a lubricant between the inner ring assembly and the outer ring after the bearing is assembled;
wherein the at least one barrier comprises the inner ring assembly, the outer ring, the first seal and the second seal.

8. The bearing of claim 1, further comprising at least one lubrication supply passage in the inner ring assembly to supply a lubricant therethrough.

9. The bearing of claim 1, further comprising at least one barrier for preventing introduction of a lubricant between the inner ring assembly and the outer ring after the bearing is assembled.

10. The bearing of claim 1, wherein each of the plurality of first rollers has a first axial length, and wherein an aspect ratio of the first length to the first diameter is between 3 to 1 and 12 to 1.

11. The bearing of claim 1, wherein the inner ball race has a first depth and the outer ball race has a second depth, the first depth and the second depth each have a magnitude equal to 35 percent to 45 percent of the ball diameter.

12. The bearing of claim 1, wherein the plurality of balls is a full complement without separators such that each of the plurality of balls touch two adjacent balls.

13. The bearing of claim 1, wherein an exterior axial surface of at least one of the first inner ring and the second inner ring extends a standoff distance beyond a respective exterior axial surface of the outer ring,
wherein the plurality of balls define an axial play; and
wherein the axial play is less than the standoff distance.

14. An actuation system for deploying and retracting a lift assisting device of a wing of an aircraft, the actuation system comprising:
a track pivotally coupled to the lift assisting device, the track having a first outer surface and a second outer surface opposite the first outer surface;
a plurality of bearings each comprising:
a single piece outer ring comprising a radially inward facing first outer roller race, a radially inward facing second outer roller race and a radially inward facing outer ball race, the first outer roller race, the second outer roller race and the outer ball race defining an interior area of the outer ring;
an inner ring assembly comprising a first inner ring and a second inner ring axially abutting one another at an abutment interface, the first inner ring having a radially outward facing first inner roller race, the second inner ring having a radially outward facing second inner roller race, the inner ring assembly being disposed in the interior area coaxially with the outer ring, and a radially outward facing inner ball race formed in at least one of the first inner ring and the second inner ring;
a plurality of first rollers each having a first roller diameter, each of the plurality of first rollers rollingly engaging the first outer roller race and the first inner roller race;
a plurality of second rollers each having a second roller diameter, each of the plurality of second rollers rollingly engaging the second outer roller race and the second inner roller race; and
a plurality of balls each having a ball diameter and a center point, each of the plurality of balls rollingly engaging the outer ball race and the inner ball race,
wherein each of the center points is aligned with the first inner roller race and the second inner roller race, and
wherein the outer ring has an outside surface that rollingly contacts one of the first outer surface and the second outer surface of the track to guide the track along an arcuate path.

15. The actuation system of claim 14, wherein the outer ball race is positioned between the first outer roller race and the second outer roller race, and wherein the inner ball race is positioned between the first inner roller race and the second inner roller race.

16. The actuation system of claim 14, wherein the abutment interface is located between axial ends of the inner ball race.

17. The actuation system of claim 14, wherein the ball diameter is less than the first roller diameter and less than the second roller diameter.

18. The actuation system of claim 14, wherein the inner ball race comprises a cylindrical segment coaxial with a longitudinal axis of the inner ring assembly and extending along a portion of the inner ball race and located centrally between opposing axial ends of the inner ball race.

19. A bearing comprising:
a single piece outer ring comprising a radially inward facing first outer roller race having a first inside diameter, a radially inward facing second outer roller race having a second inside diameter and a radially inward facing outer ball race having a maximum inside diameter, the first outer roller race, the second outer roller race and the outer ball race defining an interior area of the outer ring;

an inner ring assembly comprising a first inner ring and a second inner ring axially abutting one another at an abutment interface, the first inner ring having a radially outward facing first inner roller race, the second inner ring having a radially outward facing second inner roller race, the inner ring assembly having a longitudinal axis and being disposed in the interior area coaxially with the outer ring, and a radially outward facing inner ball race formed in at least one of the first inner ring and the second inner ring;

a plurality of first rollers each having a first roller diameter, each of the plurality of first rollers rollingly engaging the first outer roller race and the first inner roller race;

a plurality of second rollers each having a second roller diameter, each of the plurality of second rollers rollingly engaging the second outer roller race and the second inner roller race; and a plurality of balls each having a ball diameter and a center point, each of the plurality of balls rollingly engaging the outer ball race and the inner ball race, wherein the maximum inside diameter of the outer ball race is less than the first inside diameter and less than the second inside diameter.

20. An actuation system for deploying and retracting a lift assisting device of a wing of an aircraft, the actuation system comprising:

a track pivotally coupled to the lift assisting device, the track having a first outer surface and a second outer surface opposite the first outer surface;

a plurality of bearings each comprising:

a single piece outer ring comprising a radially inward facing first outer roller race having a first inside diameter, a radially inward facing second outer roller race having a second inside diameter and a radially inward facing outer ball race having a maximum inside diameter, the first outer roller race, the second outer roller race and the outer ball race defining an interior area of the outer ring;

an inner ring assembly comprising a first inner ring and a second inner ring axially abutting one another at an abutment interface, the first inner ring having a radially outward facing first inner roller race, the second inner ring having a radially outward facing second inner roller race, the inner ring assembly having a longitudinal axis and being disposed in the interior area coaxially with the outer ring, and a radially outward facing inner ball race formed in at least one of the first inner ring and the second inner ring;

a plurality of first rollers each having a first roller diameter, each of the plurality of first rollers rollingly engaging the first outer roller race and the first inner roller race;

a plurality of second rollers each having a second roller diameter, each of the plurality of second rollers rollingly engaging the second outer roller race and the second inner roller race; and a plurality of balls each having a ball diameter and a center point, each of the plurality of balls rollingly engaging the outer ball race and the inner ball race, wherein the maximum inside diameter of the outer ball race is less that the first inside diameter and less than the second inside diameter, and wherein the outer ring has an outside surface that rollingly contacts one of the first outer surface and the second outer surface of the track to guide the track along an arcuate path.

* * * * *